United States Patent
Vazquez et al.

(10) Patent No.: US 8,775,807 B1
(45) Date of Patent: Jul. 8, 2014

(54) CREDENTIAL TRACKING

(71) Applicant: MicroStrategy Inc., Vienna, VA (US)

(72) Inventors: Hector Vazquez, Ashburn, VA (US); Gang Chen, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 13/661,904

(22) Filed: Oct. 26, 2012

(51) Int. Cl.
*G06F 21/00* (2013.01)

(52) U.S. Cl.
USPC ............ 713/168; 726/1; 726/6; 713/170; 713/176

(58) Field of Classification Search
USPC .......................... 726/1, 6; 713/168
See application file for complete search history.

(56) References Cited

U.S. PATENT DOCUMENTS

| | | | |
|---|---|---|---|
| 6,477,645 B1* | 11/2002 | Drews | 713/168 |
| 7,216,109 B1* | 5/2007 | Donner | 705/64 |
| 8,295,855 B2* | 10/2012 | Narayan et al. | 455/456.3 |
| 2003/0069829 A1* | 4/2003 | Gathman et al. | 705/37 |
| 2004/0054726 A1* | 3/2004 | Doss et al. | 709/205 |
| 2010/0082491 A1* | 4/2010 | Rosenblatt et al. | 705/65 |
| 2013/0030964 A1* | 1/2013 | Nuzzi et al. | 705/30 |
| 2013/0200999 A1* | 8/2013 | Spodak et al. | 340/5.65 |
| 2013/0260717 A1* | 10/2013 | Miyaki | 455/411 |

\* cited by examiner

*Primary Examiner* — Morshed Mehedi
(74) *Attorney, Agent, or Firm* — Fish & Richardson P.C.

(57) ABSTRACT

In one implementation, a credential associated with a user identifier and a location is stored at a client device. A request to output a representation of the credential in a manner that enables a credential authority to validate the representation is received. Responsive to receiving the request to render the representation of the credential, a location of the client device is obtained and a determination that the location of the client device is within a predefined distance of the location associated with the credential is made. Responsive to determining that the location of the client device is within the predefined distance of the location associated with the credential, data indicating that the user has entered the location associated with the credential is stored in a memory of the client device.

20 Claims, 4 Drawing Sheets

CREDENTIAL TRACKING

TECHNICAL FIELD

This specification generally relates to credential tracking.

BACKGROUND

A person may be associated with a credential that, for example, permits the person to access locations and/or events.

SUMMARY

In general, one aspect of the subject matter described in this specification may include the actions of storing, at a client device, a credential associated with a user identifier and a location, receiving, at the client device, a request to output a representation of the credential in a manner that enables a credential authority to validate the representation, responsive to receiving the request to render the representation of the credential, obtaining a location of the client device, determining that the location of the client device is within a predefined distance of the location associated with the credential, responsive to determining that the location of the client device is within the predefined distance of the location associated with the credential, storing, in a memory of the client device, data indicating that the user has entered the location associated with the credential.

Some implementations include the action of transmitting, from the client device to a server, a message indicating that the user has entered the location associated with the credential.

In some implementations, storing, at a client device, a credential associated with a user identifier and a location comprises storing, at a client device, a credential associated with a user identifier, a location, and a time. In addition, the actions may include obtaining a time at the client device responsive to receiving the request to render the representation of the credential, determining that the time at the client device is within a predefined time period associated with the credential, and responsive to determining that the location of the client device is within the predefined distance of the location associated with the credential and determining that the time at the client device is within the predefined amount of time of the time associated with the credential, storing data indicating that the user has entered the location associated with the credential at the time associated with the credential.

Some implementations include the action of transmitting, from the client device to a server, a message indicating that the user has entered the location associated with the credential.

In some implementations, determining that the location of the client device is within a predefined distance of the location associated with the credential comprises determining that the location of the client device is within a first predefined distance of the location associated with the credential, and responsive to determining that the location of the client device is within the predefined distance of the location associated with the credential, storing, in a memory of the client device, data indicating that the user has entered the location associated with the credential comprises responsive to determining that the location of the client device is within the first predefined distance of the location associated with the credential, storing, in a memory of the client device, data indicating that the user has entered the location associated with the credential. In addition, the actions may include, after determining that the location of the client device is within the first predefined distance of the location associated with the credential, determining that the location of the client device is beyond a second predefined distance of the location associated with the credential, and responsive to determining that the location of the client device is beyond the second predefined distance of the location associated with the credential, storing, in a memory of the client device, data indicating that the user has left the location associated with the credential.

Some implementations include the action of transmitting, from the client device to a server, a message indicating that the user has left the location associated with the credential. The first predefined distance may be the same as the second predefined distance.

Some implementations include the actions of determining that the client device lacks network connectivity, responsive to determining that the client device lacks network connectivity, caching a message indicating that the user has entered the location associated with the credential for subsequent transmission to a server when network connectivity is restored, determining that network connectivity has been reestablished, and responsive to determining that network connectivity has been reestablished, sending the cached message to the server.

Some implementations include the action of outputting, at the client device, the representation of the credential in a manner that enables the credential authority to validate the representation.

Other features may include corresponding systems, apparatus, and computer programs encoded on computer storage devices configured to perform the foregoing actions.

The details of one or more implementations are set forth in the accompanying drawings and the description, below. Other features will be apparent from the description and drawings, and from the claims.

DETAILED DESCRIPTION

In some instances, it can be beneficial to generate representations of credentials for groups of users or for individuals. The credentials can be, for example, badges to gain entrance to a location or event, a ticket for entry to a location or event, a key that unlocks a lock (e.g., for entry to a location), etc. Furthermore, it may be advantageous to track users associated with these credentials as they enter and/or leave the locations and/or events. A location can be, for example, a venue where events are held, a private residence, a commercial space, a room, or any other physical space. An event can be, among other things, any gathering of people at a specified date, time, and location.

Credentials can be maintained on and/or accessed from computing devices (e.g., mobile computing devices like smart phones and tablet computers) and credentials can be represented in various forms as described below. For example, credentials can be represented by parametrically-generated graphical representations, animated graphical representations, phrases, numeric representations, and/or optical machine-readable representations. For an event and/or location, a server, or collection of servers, can manage and distribute credentials to appropriate users' client devices. The representations for the credentials then can be outputted for evaluation by a credential authority at the event and/or location to confirm that the credentials presented are valid. Some representations for credentials may be presented for visual inspection. Such representations may be the same for all (or designated subgroups of) authorized invitees to an event, and the credential authority may therefore be able to confirm that the presented representations are valid by visual inspection but may be unable to determine the identity of the invitees presenting the credentials. Advantageously, some implementations described herein may generate records of usage of such visually-inspected representations as invitees enter and/or leave an event. For example, these records may be generated based on the location and/or time the invitees present the visually-inspected representations.

Credential-based techniques for tracking users entering and leaving events and/or locations are described below. First, a general description of example implementations will be described. Then, more detailed implementations are described.

Figure 1:
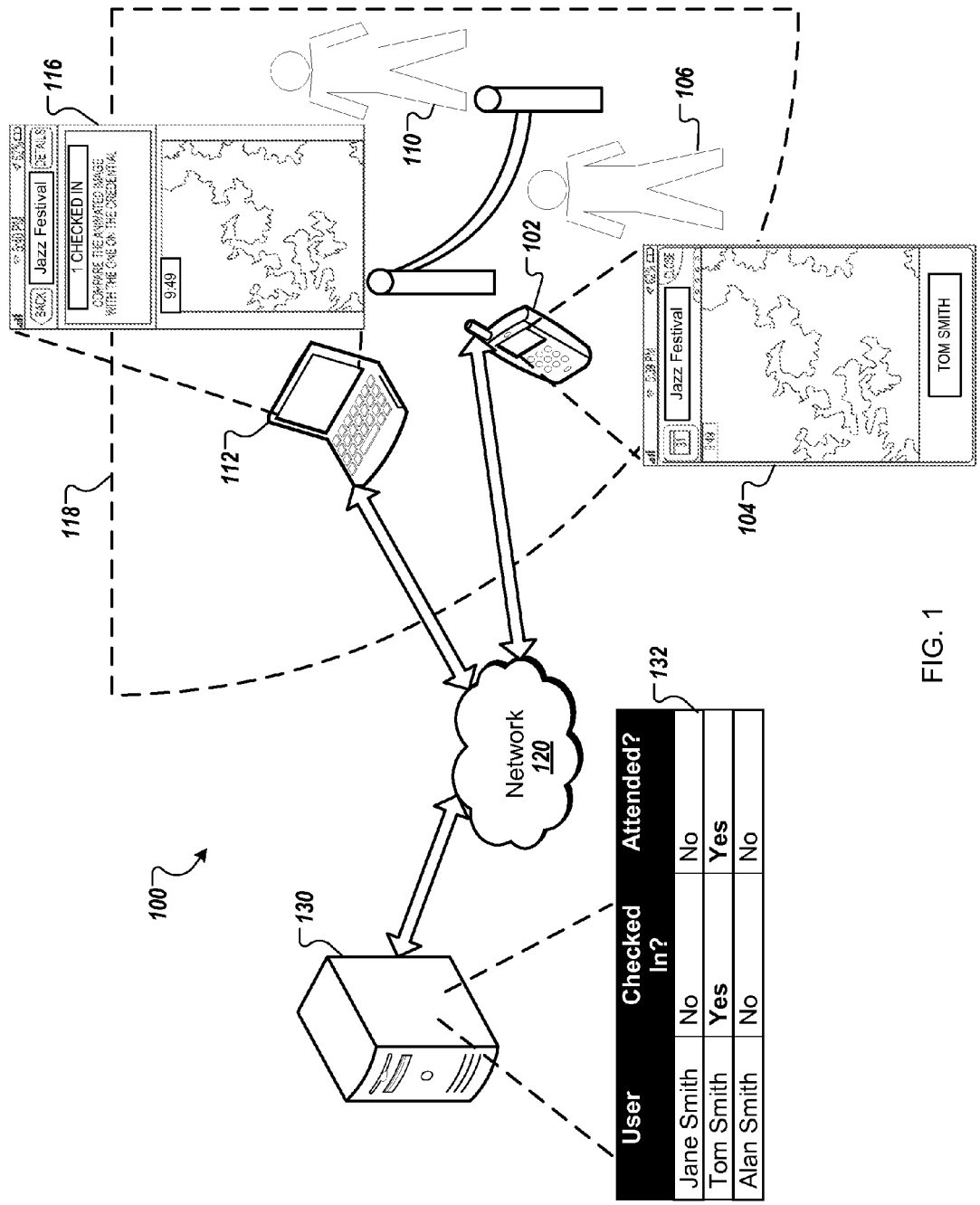
FIG. 1 is a diagram of an example system that enables tracking of users who enter locations and/or events.

FIG. 1 illustrates an example system 100 that enables tracking of users who use computing devices to present credentials to enter locations and/or events. In the example, the client device 102 renders a representation of a credential 104 associated with a user 106 (e.g., Tom Smith). The representation of the credential 104 authorizes the user 106 to enter an event associated with the location 118. For example, the event could be a jazz festival that Tom Smith has purchased a ticket to attend, and the location could be a concert hall where the jazz festival is being held. A credential authority 110 (e.g., door manager) permits users to enter the jazz festival when the users present the appropriate credentials.

For example, the client devices of users (e.g., the client device 102 of user 106) may show parametrically-generated representations for credentials that are synchronized with a parametrically-generated representation for a credential displayed on the door manager's processing system 112, such that the door manager permits users who show the correct parametrically-generated representations into the event. As described in more detail below, a parametrically-generated graphical representation may be a visual display that is generated using one or more parameters as inputs to one or more mathematical equations, such as a three-dimensional rendering of an object or an image of a fractal. For example, the representation for the credential 104 on the client device 102 includes an image of a fractal generated using a set of parameters as inputs. The image is a region of the Mandelbrot set that may be rendered according to the techniques described below, and the colorization of the image can be animated. The display may also include a timer indicating the time remaining until the image of a fractal will be updated (i.e., 9 minutes and 49 seconds).

The processing system 112 may access a table 132 via the server 130 that includes information about how many users have checked into the event. As described herein, a user may be considered to have checked into the event, for example, when the user is presently attending an event, or has entered an event. The processing system 112 may then display statistics on how many users have checked into the event. For example, the processing system 112 may display a current number of users checked into the event. In this example, a single user has checked in as indicated on the display 116 of the processing system 112 (e.g., the user Tom Smith is the first user to check into the event).

When the user 106 operates a mobile application executing on the client device 102 to display the representation of the credential 104 to the credential authority 110, the client device 102 determines the current location of the client device 102 as described below. If the client device 102 determines that the current location of the client device 102 is within a predefined distance of the location 118 associated with the event, the client device 102 infers that the user 106 associated with the credential for which the visual representation 104 was displayed has entered the event and notifies the server 130 via the network 120 that the user has entered the event. The server 130 then updates a table 132 stored at the server 130, or accessible to the server 130, with the status of the user 106 for the event. For example, the server 130 can update an entry for the event associated with Tom Smith to indicate that: (i) Tom Smith checked into the event, and/or (ii) Tom Smith attended the event.

In some cases, the event also may be associated with a time and date. For example, a performance at the jazz festival may be scheduled to occur from 8:00 p.m. to 9:00 p.m. on a specific Friday night. If doors open for the performance at 7:30 p.m., then the performance could be associated with a time period of 7:30 p.m. to 9:30 p.m. on the specific Friday night. When the user 106 operates a mobile application executing on the client device 102 to display the representation of the credential 104 to the credential authority 110, the client device 102 determines the current location of the client device 102 as well as the current time. If the client device 102 determines that the current location of the client device 102 is within a predefined distance of the location 118 associated with the event and the current time is within the predefined time period associated with the event, the client device 104 infers that the user 106 associated with the credential for which the visual representation 104 was displayed has entered the event and notifies the server 130 via the network 120 that the user 106 has entered the event. In contrast, if the current time at the client device 102 is outside the predefined time period, the client device 102 may infer that the user 106 has not entered the event and, therefore, the client device 102 may not send a message notifying the server 130 that the user 106 has entered the event. In some implementations, instead of the client device 102 determining if the location at which the representation of the credential 104 is shown is within the predefined distance of the location associated with the event and/or if the time at which the representation of the credential 104 is shown is within the predefined time period associated with the event, the client device 102 may transmit a message to the server 130 that indicates that the representation of the credential 104 has been shown and that includes data indicative of the location at which the representation of the credential 104 was shown, and the server may then determine whether the user 106 has entered the event.

Figure 2:
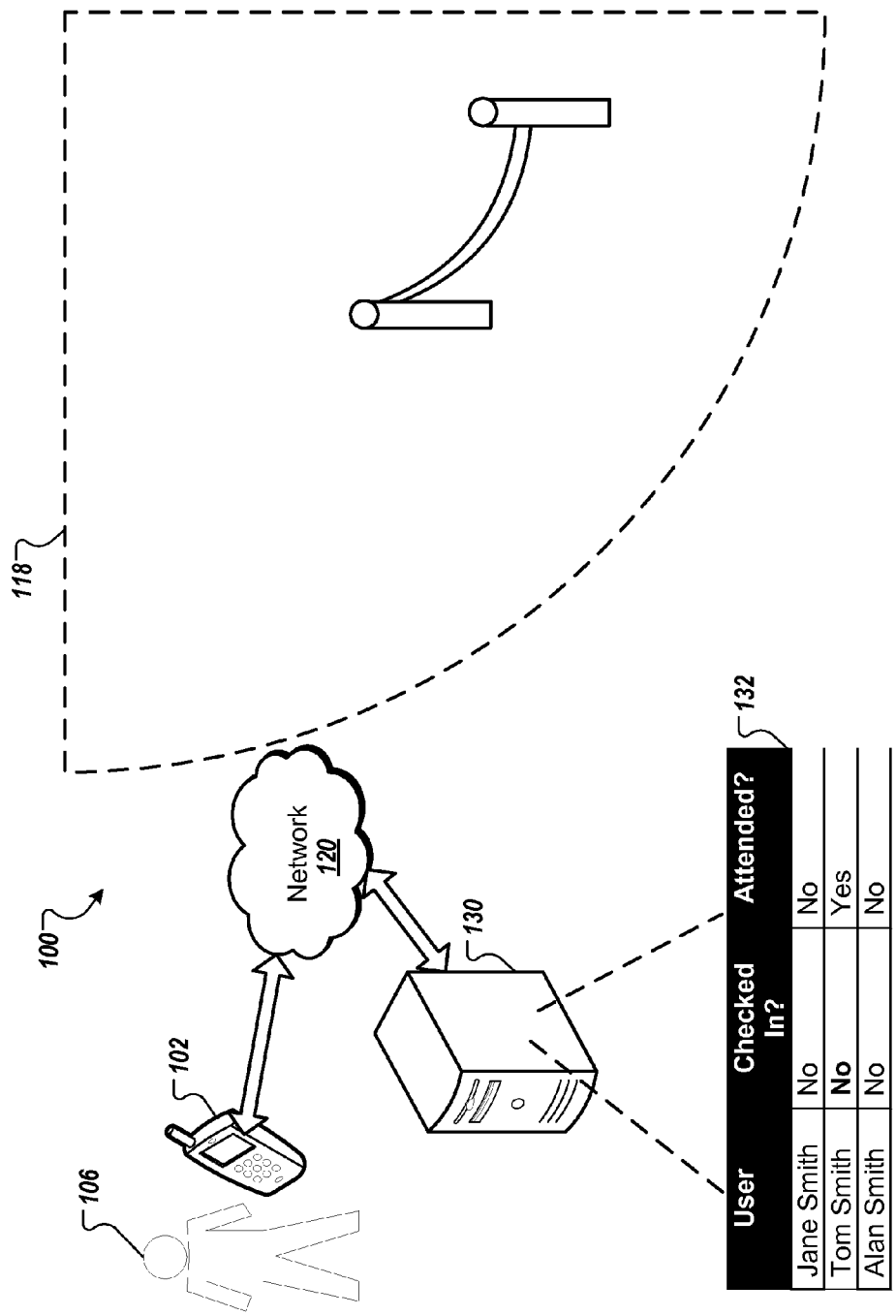
FIG. 2 is a diagram of an example system that enables tracking of users who leave locations and/or events.

FIG. 2 shows that the example system 100 also may enable the tracking of users who used computing devices to present credentials to gain entrance to a location and/or event as they leave the location and/or event. In particular, as illustrated in FIG. 2, after previously inferring that the user 106 entered the event (e.g., as illustrated and discussed above in connection with FIG. 1), the client device 102 may detect that the user 106 has left the location 118 associated with the event. In response, the client device 102 then notifies the server 130 via network 120 that the user 106 has left the location 118. In this example, the server 130 updates an entry in table 132 (e.g., an entry for Tom Smith) to indicate that the user 106 is no longer checked into the event. Notably, however, the server 130 maintains the indication in the entry for user 106 in table 132 that the user 106 attended the event even though user 106 no longer is checked into the event.

In operation, the server 130 manages and stores one or more credentials, associates users and groups of users with credentials, and provides the credentials to users' client devices and/or processing systems (e.g., operated by credential authorities) for validation. The server 130 can be any suitable computer or collection of computers executing software capable of managing, distributing, and validating representations of credentials for users and groups of users.

Credentials, user accounts, group accounts, and administrative accounts can be stored in a database (e.g., MySQL, PostgreSQL, MS SQL Server, MongoDB, etc.), or other suitable data structure that can be accessed by the server 130. Likewise, attendance information (e.g. table 132) regarding locations and/or events can also be stored in a database or other suitable data structure. In some implementations, the server 130 may access the stored credentials, attendance information, and/or user accounts via web services such as representational state transfer (REST) style services.

The server 130 typically creates a credential in response to input provided by a credential grantor (e.g., an event host or location manager). The credential may include a variety of information such as a description of an event or location, a credential identifier (e.g., a number or character string that uniquely identifies the credential), and/or one or more designated credential authorities.

In particular, each credential may be associated with a geographic location. The geographic location may be stored as, for example, a point identified by a latitude coordinate and a longitude coordinate (e.g., 38.915530, −77.220604), a polygon whose boundaries are defined by a set of latitude/longitude coordinate pairs (e.g., 38.910000, −77.220000; 38.810000, −77.220000; 38.810000, −77.120000; 38.910000, −77.120000), a street address (e.g., 100 Main Street, Washington, D.C.), etc. In some implementations, the geographic location may be associated with an indication of a predefined distance from the location (e.g., 1000 yards) that a client device can use to determine whether it has entered or left the location. In other implementations, the geographic location may be associated with indications of two predefined distances (e.g., 500 yards and 1000 yards), so that a client device can use the first distance to determine whether it has entered the location and the second distance to determine whether it has left the location. Depending on the implementation, these two distances may be the same or different. Moreover, the predefined distances may be default distances for all events, default distances for different categories of events, or different for each event (e.g., a predefined distance may be stored with each credential).

Credentials associated with events also may have associated time periods, for example, the time periods during which the events are scheduled to occur or longer windows of time that include the time periods during which the events are scheduled to occur. The time periods may be stored in any suitable format, such as, for example, a pair of dates plus times, a starting date and time plus a duration, or a pair of times since epoch.

The server 130 may present a suitable interface to the credential grantor for creation of credentials. For example, the server 130 may present a web interface through which the grantor can interact via a Web browser. In other aspects, the server 130 may be directly accessible via a graphical-user interface or an application running on a mobile device. Any suitable interface can be used that enables the creation and storage of credentials and user accounts. In addition to creation of credentials by credential grantors, credentials could be created at the request of registered users through a web-based or other interface or through any other suitable mechanism such as sending email or short message service (SMS) to grantors. In some implementations, registered users may be able to create credentials by use of an application running on a client device.

The server 130 also may present an interface so that users and/or credential grantors can create user accounts for individual users and groups of users. For example, the server 130 may present a web interface through which users and/or credential grantors can interact via a Web browser. Alternatively, the server 130 may be directly accessible via a graphical-user interface or an application on a mobile device. User accounts may be stored in a table or collection of tables in a database, or in any other suitable data structure accessible by the server 130. The user accounts may include a variety of information such as user name, user identifier (e.g., a number or character string that uniquely identifies a user), and the address(es) of one or more client devices owned by or otherwise associated with the user. Likewise, group accounts may be stored in a table, collection of tables, or other suitable data structure. Certain individual users may be identified as belonging to a group by linking an entry for the user to an entry for the group, for example by use of a linking table. The group accounts may include a variety of information such as a group name, group identifier (e.g., a number or character string that uniquely identifies a group), and a description of the group.

As an example, a new user, Tom Smith, may request a new user account from the server 130 using an application executing on his client device. The server 130 can then create database entries representing a user account for Mr. Smith. A credential grantor (e.g., a promoter of a jazz festival) then can create a row in another table for a group identified as individuals who have purchased tickets to the jazz festival. When Mr. Smith purchases a ticket to the jazz festival, the grantor can then link the database entry for Mr. Smith to the group account for ticketholders for the jazz festival through use of a linking table.

Once credentials and users, or groups of users, have been created, credential grantors and/or users can associate the credentials with users, or groups of users. For example, the server 130 may present a web interface through which grantors can interact via a Web browser to link a given credential to a given user or group of users. In other aspects, the server 130 may be directly accessible via a graphical-user interface or an application on a mobile device. Credentials may be associated with users, or groups of users, for example, by linking a database entry for a credential to a database entry for a user, or group of users, by use of a linking table. In addition to association of credentials to users and groups of users by grantors, registered users also may request that certain users, or groups of users, be associated with certain credentials through a web-based or other interface, or through any other suitable means such as sending email or SMS to grantors.

When credentials are associated with users, the server 130 may notify the users that they have been associated with the credentials, for example by pushing notifications to the respective users' client devices. Such a notification may include the credential identifier for the credential, a representation of the credential itself, and/or the user identifier. In addition or as an alternative to receiving a push notification from the server 130, the client devices may obtain the credential identifier, the representation of the credential, and/or the user identifier in various other ways. For example, the client devices may request the credential identifier, the representation of the identifier, and/or the user identifier from the server 130. In some implementations, an application executing on the client device may have the user identifier pre-installed, or may receive a user identifier when a user first runs the application and creates a user account associated with the application, or may receive a user identifier when a user logs into the application from the client device. In such implementations, the application executing on the client device may use the user identifier to request indications of any credentials that have been associated with the user identifier.

In some implementations, the creation and management of user accounts, group accounts, and credentials could be partially or completely automated. For example, a web-based application could act as a ticket agent for a jazz festival, with tickets for the festival corresponding to credentials. An interested user could access the web-based application via a web-browser or mobile application, pay a ticket fee online, and, when the user's payment is verified, the web-based application could automatically create an account for the user and associate the account with the credential for the event.

Once credentials have been associated with appropriate user and/or group accounts, the credentials can then be distributed to client devices for the appropriate users via the network 120. For example, the network 120 may be a local area network ("LAN") and a wide area network ("WAN"), e.g., the Internet. In some versions, the server 130 may communicate with the client devices via SMS or multimedia messaging service (MMS). The server 130 may access user accounts in a database to locate the appropriate users' client devices.

The representation of a credential may take a variety of different forms. For example, the representation may be a parametrically-generated graphical representation, an animated graphical representation, a phrase, a numeric representation, and/or an optical machine-readable representation as described in U.S. Provisional Patent App. Ser. No. 61/670,456, entitled User Credentials, and filed on Jul. 11, 2012, and U.S. Provisional Patent App. Ser. No. 61/691,526, entitled User Credentials, and filed on Aug. 21, 2012, both of which are hereby incorporated by reference in their entirety. Certain representations (e.g., a parametrically-generated graphical representation, an animated graphical representation, and/or a phrase) may be visually-inspected by a credential authority as described below. Such representations may be the same for all (or designated subgroups of) authorized invitees to an event, and the credential authority may therefore be able to confirm that the presented representations are valid, but may be unable to determine the identity of the invitees presenting the credentials. Advantageously, some implementations described herein may generate records of usage of such visually-inspected representations as invitees enter and/or leave an event. For example, these records may be generated based on the location and/or time the invitees present the visually-inspected representations.

As referred to herein, a parametrically-generated graphical representation may be a visual display that is generated using one or more parameters as inputs to one or more mathematical equations, such as a three-dimensional rendering of an object or an image of a fractal. In certain implementations, the parameters can be generated from seed values such as a credential identifier and a time. In operation, the client device 102 can obtain a credential identifier (e.g., from a memory of the client device) and a time (e.g., from a timing device of the client device), and generate a parametrically generated graphical representation for the credential using the credential identifier and time as seed values. Similarly, for validation, the processing system 112 obtains a credential identifier and a time, and generates a parametrically generated graphical representation for the credential in the same manner. When the timing device at the processing system 112 is synchronized with the timing device at client device 102, the parameters generated at the processing system 112 should be identical (or nearly identical) to those of the client device 102 when the credential identifiers are the same. The graphical representation generated by processing system 112 should therefore match the graphical representations on the client device 102, allowing the credential authority 110 to visually validate the credential on the client device 102.

As referred to herein, an animated graphical representations may be, for example, a hypertext markup language (HTML) animation, animated graphical interchange format (GIF) file, Motion Pictures Expert Group (MPEG) file, Adobe Flash® animation, or any combination thereof. An animation may be, for example, a sequence of images defined by one of these files. Applications executing on the client device 102 may access the stored graphical representations by way of index values, where an index value may correspond to a single representation of the credential. In operation, a client device 102 obtains a credential identifier (e.g., from a memory of the client device) and a time (e.g., from a timing device of the client device), and selects an animated graphical representation for the credential by using the credential identifier and the time to generate an index value. Similarly, for validation, the processing system 112 obtains a credential identifier and a time, and selects an animated graphical representation for the credential in the same manner. When the timing device at the processing system 112 is synchronized with the timing device at client device 102, the index values generated at the processing system 112 should be substantially identical to those of the client device 102 when the credential identifiers are the same. The graphical representation selected by processing system 112 should therefore match (or nearly match) the graphical representations on the client devices 102, allowing the credential authority 110 to visually validate the credential on the client device 102.

As referred to herein, a phrase may be a sequence of two or more words selected from one or more dictionaries of words that need not form a grammatical construct. A dictionary as used herein is a data structure in which index values identify words. A given dictionary may include many thousands of different words. In operation, applications for credential validation executing on the client device 102 and the processing system 112 can access a common set of dictionaries for generating phrases, so that when the applications reference the same index values in the same dictionaries, at substantially the same time, they can select the same phrases. Thus, the processing system 112 displays the same phrase as the client devices 102, which enables the credential authority 110 to validate the phrases at the client device 102.

The client device 102 can receive credentials or data indicative of credentials from server 130 and store them in any suitable memory for later retrieval. Applications executing on the client device 102 can then retrieve the credentials and generate/obtain representations so they can be presented to a credential authority for validation. For example, an application executing on the client device 102 may provide a graphical user interface through which the user 106 can access event and credential information. The client device 102 may be any type of computing device, including but not limited to a mobile phone, a smart phone, a PDA, a music player, an e-book reader, a tablet computer, a laptop or desktop computer, or any other stationary or portable device, that includes one or more processors and non-transitory computer readable storage media. The software application can be written in any suitable programming language such as, for example, Objective-C, C++, Java, etc.

While shown in FIG. 1 as a person, the credential authority 110 can be any agent capable of validating representations of credentials presented by users. As an example, the credential authority 110 could be a software application executing on the processing system 112 that is programmed to validate representations of credentials presented by users. The software application could then control an automated gate to permit validated users to enter. The processing system 112 can also be any suitable computer or set of computers capable of communicating with the server 130 via network 120, such as a mobile phone, smart phone, PDA, tablet computer, laptop or desktop computer, or other stationary or portable device, that includes one or more processors and non-transitory computer readable media.

Figure 3:
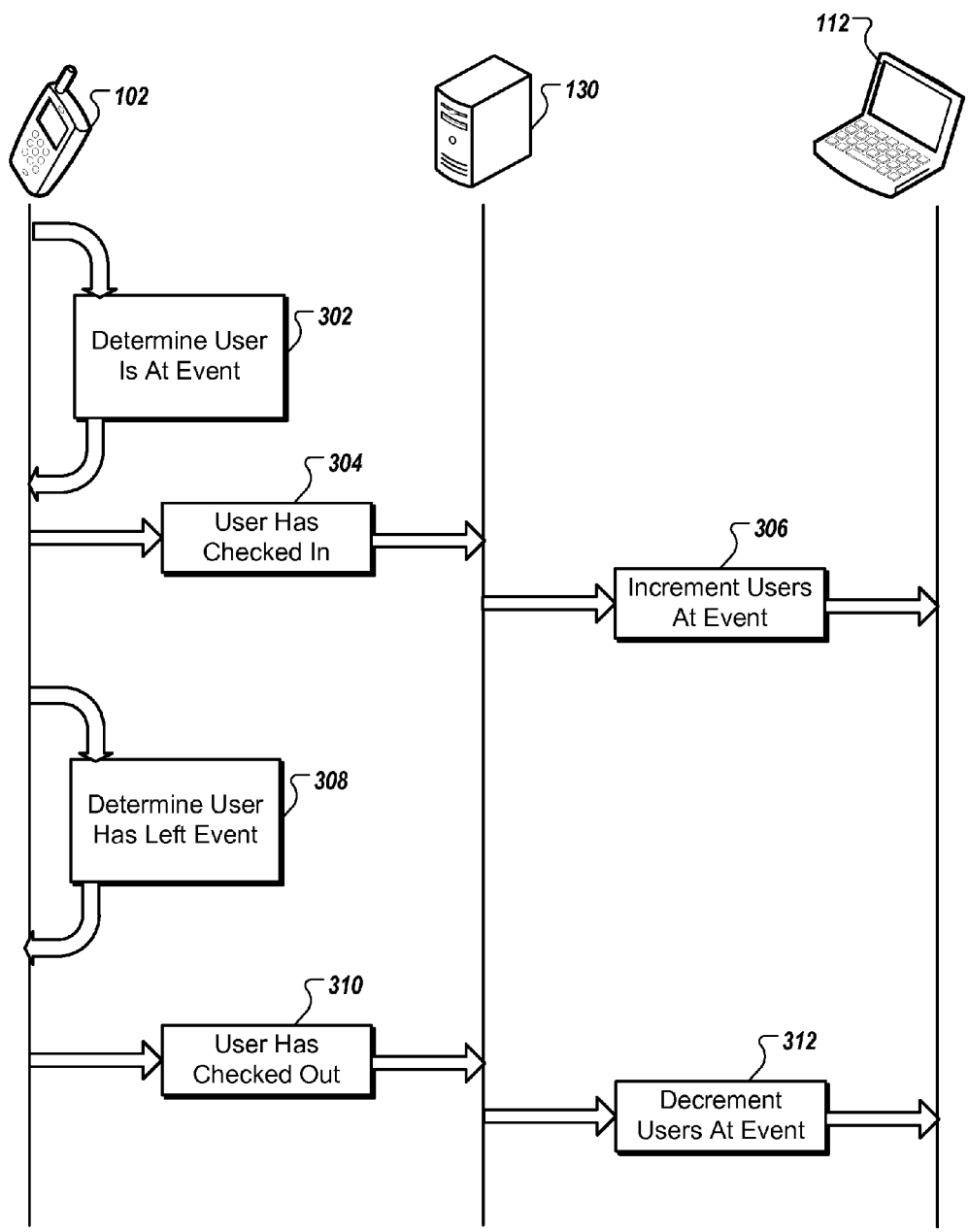
FIG. 3 is a messaging diagram that illustrates sample messages between a client device, server, and processing system in a system that enables tracking of users who enter and leave locations and/or events.

FIG. 3 shows sample messages between a client device 102, server 130, and processing system 112 in a system that enables tracking of users who enter and leave locations or events. The messages described below may be transmitted via any suitable protocol such as, for example, hypertext transfer protocol (HTTP) or SMS. Additionally, these example messages should not be considered limiting, as any suitable mechanism for performing the functions described could be used, and the messages could be sent or received in any suitable sequence.

Initially, a user 106 operates a client device 102 to show a representation for a credential to a credential authority 110. In response, in step 302, a mobile application executing on the client device 102 determines whether the client device 102 has entered an event and/or location 118 associated with the credential. The application may determine whether the client device 102 has entered the event and/or location 118 associated with the credential based on one or more of the location at which the representation of the credential is displayed and the time at which the representation of the credential is displayed. The application may use any suitable technique to determine the location of the client device. For example, when the user 106 activates the application to cause the client device to display the representation of the credential, the application may cause the client device 102 to determine its location based on global positioning system (GPS), Wi-Fi, or any other suitable technique of determining location. The application then compares the current location of the client device with the geographic location associated with the credential. If the representation of the credential for the event is displayed within a predefined distance of the associated event location, then the application may infer that the representation of the credential was displayed to gain entrance to the event and/or location. Consequently, the application may determine that the client device 102 has entered the event and/or location 118 associated with the credential. For example, if Tom Smith accesses his ticket for the jazz festival within 500 yards of the associated concert hall, the application may infer that Mr. Smith has entered the festival.

Alternatively or in addition, a mobile application on the client device 102 may receive a notification that the client device has entered a location 118 associated with the credential without requiring user action. For example, the credential may be associated with a significant-change location service and/or a geofence. As described herein, a significant-change location service provides notifications by using a client device's cellular radio to determine the user's location and then report changes in that location. In some cases, this service is also capable of waking up an application that is currently suspended or not running in order to deliver new location data.

As described herein, a geofence may be a virtual perimeter for a real-world geographic region. Applications can generate geofences so as to be notified when the user crosses geographic boundaries. For example, this capability can generate alerts when a user gets close to a specific location, leaves a specific location, and/or crosses a region boundary. In some cases, regions associated with an application are continuously tracked. If a region boundary is crossed while an application is not running, that application may be relaunched into the background to handle the event. Similarly, if the application is suspended when the event occurs, it may be woken up and given a short amount of time to handle the event. Geofences may be, for example, dynamically generated, such as in a radius around a venue or point location, or could include a predefined set of boundaries, such as streets around a venue or neighborhood boundaries.

Additionally or alternatively, if the credential includes an associated time period, when the user 106 activates the application to cause the client device 102 to display the representation of the credential, the application on the client device 102 may also determine a current time and compare the current time with the time period associated with the credential as part of determining whether the client device 102 has entered the event and/or location 118 associated with the credential. For example, the client device 102 may obtain a current timestamp (e.g., seconds or milliseconds from epoch) from a timing device such as a hardware or software clock located at the client device 102. This timestamp can then be compared with the time period associated with the credential. If the application on the client device 102 determines that the current time is within the time period associated with the credential (e.g., the event is in progress, about to begin, etc.), the application on the client device 102 may infer that the representation of the credential was displayed to gain entrance to the event and/or location. Consequently, the application may determine that the client device 102 has entered the event and/or location 118 associated with the credential. Otherwise, the application on the client device 102 may determine that the representation of the credential was not displayed to gain entrance to the event and/or location 118 associated with the credential (e.g., the event has not yet begun or has already ended). Further to the example above, if Tom Smith accesses his ticket for a performance scheduled from 8:00 p.m. to 9:00 p.m. at the jazz festival within 500 yards of the associated concert hall at 7:45 p.m. (i.e., during the 7:30 p.m. to 9:30 p.m. time period associated with a performance), the application may infer that Mr. Smith has checked into the performance.

Upon determining that the client device 102 has entered the event and/or location 118 associated with the credential, the client device 102 stores data in a suitable memory indicating that the user 106 has entered the event and/or location 118 associated with the credential. In addition, the client device 102 may transmit a message 304 to the server 130 indicating that the user 106 has checked into the event and/or location 118 associated with the credential. In response, the server 130 can then update attendance information for the user 106 associated with the client device 102 and credential. For example, the server 130 may update a table 132 stored at the server, or accessible to the server, with the status of the user 106 to indicate that the user 106 is checked in to the event (e.g., the user 106 is presently attending an event, has entered an event, etc.). In some implementations, the table may also include separate data identifying users who have attended the event. For example, the sample table 132 in FIG. 1 includes three columns with attendance information for an event: a user column (e.g., Jane Smith, Tom Smith, and Alan Smith), a checked in column identifying whether each user is currently checked into the event (e.g., No, Yes, and No respectively), and an attended column identifying whether each user has attended the event irrespective of whether they are currently checked into the event (e.g., No, Yes, No).

After updating the attendance information, the server 130 may push a message 306 to the processing system 112 operated by the credential authority to notify the credential authority 110 that an additional user has checked into the event. Alternatively or in addition, the processing system 112 may periodically request updated attendance information from the server 130, in which case the server 130 responds with the attendance information when requested.

After (and, in some implementations, as a consequence of) determining that the user 106 has checked into the event and/or location 118, in step 308, the application monitors whether the client device 102 has left the event and/or location 118. Similar techniques to those described above may be used to determine when the client device 102 has left the location 118. In particular, the client device 102 may implement a significant-change location service and/or a geofence, or periodically determine its location to determine whether it has gone beyond a predefined distance of the location 118. In some implementations, different predefined distances may be associated with the location 118 for determining whether the client device has entered the location and for determining whether the client device has left the location. For example, when the application on client device 102 is determining whether the client device 102 is entering the location 118, it may use a first predefined distance of the location (e.g., a 500 yard radius); and when the application on the client device 102 is determining whether the client device 102 is leaving the location 118, it may use a second predefined distance of the location (e.g., a 1000 yard radius). Alternatively or in addition, the client device 102 may wait until the client device 102 has been outside of the predefined distance of the location for some defined period of time (e.g., 10 minutes, 30 minutes, etc.) before determining that the user has checked out.

Upon determining that the client device 102 has left the location 118, the application on the client device 102 stores data in a suitable memory indicating that the user 106 has left the event and/or location 118. In addition, the client device 102 may transmit a message 310 to the server 130 indicating that the user 106 has left the event and/or location 118. In response, the server 130 can then update attendance information for the user 106 to indicate that the user 106 has left. For example, the server 130 may update the table 132 with the status of the user 106 to indicate that the user 106 is checked out of the event. After updating the attendance information, the server 130 may transmit a message 312 to the processing system 112 operated by the credential authority to notify the credential authority 110 that one user has checked out of the event.

In some instances, the client device 102 may lose connectivity to the network 120 (e.g., the client device 102 may lose reception due to going underground or the presence of too many users in close proximity at the event may overload the local bandwidth of the network 120). Some implementations may address this issue by caching messages at the client device 102 until network connectivity is reestablished. In particular, the client device 102 may determine that it has lost network connectivity, and, in response, cache messages indicating that: (i) the user 106 of the client device 102 has entered the event and/or location 118; and/or (ii) the user 106 of the client device 102 has left the event and/or location 118. The client device 102 then monitors network connectivity and, upon determining that network connectivity has been reestablished, transmits the cached message(s) to the server 130.

Figure 4:
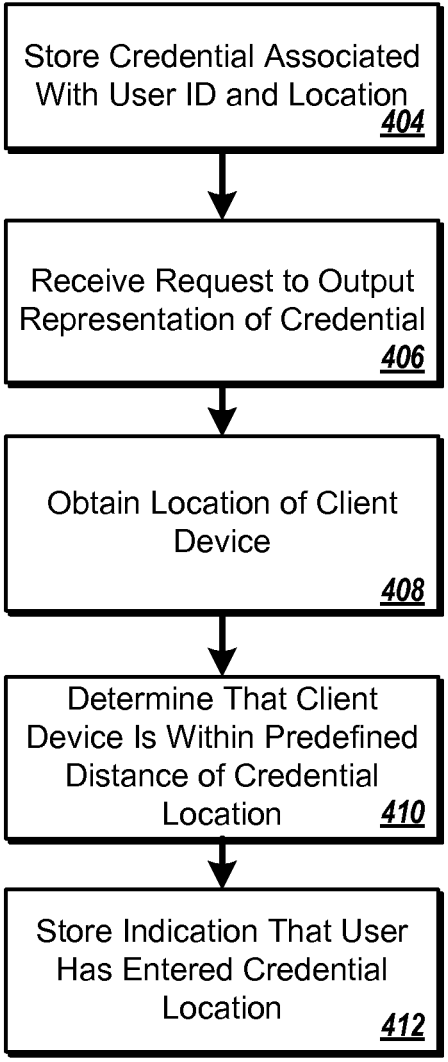
FIG. 4 is a flowchart of an example process for tracking users who enter and leave locations and/or events.

FIG. 4 illustrates an example process 400 for tracking of users who enter and leave locations or events. As shown, in step 404, a client device stores a credential associated with a user identifier and a location. The location may be, for example, a latitude and longitude, a polygon defined by a set of latitude/longitude pairs, or a street address. In some implementations, the client device also stores a time period associated with the credential.

Next, in step 406, the client device receives a request from a user (e.g., a user input to an application executing on the client device) to output a representation of the credential. Such a request may be for the purpose of enabling a credential authority to validate the representation for the credential, for example to authorize the user to enter a location or event.

Responsive to receiving the request, in step 408, the client device obtains its location. For example, the client device may use GPS or Wi-Fi to obtain its geographic location. The client device then determines whether it is located within a predefined distance of the location associated with the credential in step 410. In some implementations, the client device also obtains a current time at the client device and determines whether the current time is within a predefined time period associated with the credential.

If the client device determines that it is within the predefined distance of the location associated with the credential (and optionally that the current time is within the predefined time period associated with the credential), then the client device stores data indicating that the user has entered the location associated with the credential in step 412. In some implementations, the client device then transmits a message to a server indicating that the user has entered the location associated with the credential.

Furthermore, the client device may monitor its location after entering the location associated with the credential. Upon determining that the location of the client device is beyond a predefined distance of the location associated with the credential, the client device may store data indicating that the user has left the location associated with the credential. This predefined distance may be the same as, or different than, the distance used to determine whether the client device had entered the location. In some implementations, the client device then transmits a message to a server indicating that the user has left the location associated with the credential.

In some implementations, the client device monitors network connectivity. Upon determining that the client device lacks network connectivity, the client device caches a message indicating that the user has entered the location associated with the credential. Similarly, the client device may cache a message indicating that the user has left the location associated with the credential. When the client device detects that network connectivity has been restored, the client device can subsequently transmit the message or messages to the server.

Furthermore, in some implementations, the client device outputs a representation of the credential in a manner that enables a credential authority to validate the representation. As discussed above, the technique for validating the credential will depend upon the type of representation output by the client device.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a touchscreen and/or a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as a network described above. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

The invention claimed is:

1. A non-transitory computer-readable medium storing instructions executable by one or more computers that, upon execution, cause the one or more computers to perform operations comprising:
   storing, at a client device, a credential identifier associated with a user identifier and a location;
   receiving, at the client device, a request to output a graphical representation of the credential in a manner that enables a credential authority to validate the graphical representation;
   responsive to receiving the request to output the graphical representation of the credential:
      obtaining, at the client device, a time measured by a timing device of the client device;
      generating, at the client device, the graphical representation of the credential based on the credential identifier and the time;
      outputting, to a display of the client device, the generated graphical representation in a manner that enables the credential authority to validate the credential by visual inspection of the generated graphical representation;
      obtaining a location of the client device;
      determining that the location of the client device is within a predefined distance of the location associated with the credential;
      responsive to determining that the location of the client device is within the predefined distance of the location associated with the credential, storing, in a memory of the client device, data indicating that the user has entered the location associated with the credential.

2. The computer-readable medium of claim 1, wherein the operations further comprise transmitting, from the client device to a server, a message indicating that the user has entered the location associated with the credential.

3. The computer-readable medium of claim 1, wherein storing, at a client device, a credential associated with a user identifier and a location comprises storing, at a client device, a credential associated with a user identifier, a location, and a time;
   wherein the operations further comprise:
      obtaining a time at the client device responsive to receiving the request to render the representation of the credential;
      determining that the time at the client device is within a predefined time period associated with the credential; and
      responsive to determining that the location of the client device is within the predefined distance of the location associated with the credential and determining that the time at the client device is within the predefined amount of time of the time associated with the credential, storing data indicating that the user has entered the location associated with the credential at the time associated with the credential.

4. The computer-readable medium of claim 3, wherein the operations further comprise transmitting, from the client device to a server, a message indicating that the user has entered the location associated with the credential.

5. The computer-readable medium of claim 1,
   wherein determining that the location of the client device is within a predefined distance of the location associated with the credential comprises determining that the location of the client device is within a first predefined distance of the location associated with the credential;

wherein responsive to determining that the location of the client device is within the predefined distance of the location associated with the credential, storing, in a memory of the client device, data indicating that the user has entered the location associated with the credential comprises responsive to determining that the location of the client device is within the first predefined distance of the location associated with the credential, storing, in a memory of the client device, data indicating that the user has entered the location associated with the credential; and wherein the operations further comprise:

after determining that the location of the client device is within the first predefined distance of the location associated with the credential, determining that the location of the client device is beyond a second predefined distance of the location associated with the credential; and responsive to determining that the location of the client device is beyond the second predefined distance of the location associated with the credential, storing, in a memory of the client device, data indicating that the user has left the location associated with the credential.

6. The computer-readable medium of claim 5, wherein the operations further comprise transmitting, from the client device to a server, a message indicating that the user has left the location associated with the credential.

7. The computer-readable medium of claim 5, wherein the first predefined distance is the same as the second predefined distance.

8. The computer-readable medium of claim 1, wherein the operations further comprise:

determining that the client device lacks network connectivity;

responsive to determining that the client device lacks network connectivity, caching a message indicating that the user has entered the location associated with the credential for subsequent transmission to a server when network connectivity is restored;

determining that network connectivity has been reestablished; and responsive to determining that network connectivity has been reestablished, sending the cached message to the server.

9. The computer-readable medium of claim 1, wherein the operations further comprise outputting, at the client device, the representation of the credential in a manner that enables the credential authority to validate the representation.

10. A computer-implemented method comprising:

storing, at a client device, a credential identifier associated with a user identifier and a location;

receiving, at the client device, a request to output a graphical representation of the credential in a manner that enables a credential authority to validate the graphical representation;

responsive to receiving the request to output the graphical representation of the credential:

obtaining, at the client device, a time measured by a timing device of the client device;

generating, at the client device, the graphical representation of the credential based on the credential identifier and the time;

outputting, to a display of the client device, the generated graphical representation in a manner that enables the credential authority to validate the credential by visual inspection of the generated graphical representation;

obtaining a location of the client device;

determining that the location of the client device is within a predefined distance of the location associated with the credential;

responsive to determining that the location of the client device is within the predefined distance of the location associated with the credential, storing, in a memory of the client device, data indicating that the user has entered the location associated with the credential.

11. The method of claim 10, further comprising transmitting, from the client device to a server, a message indicating that the user has entered the location associated with the credential.

12. The method of claim 10, wherein storing, at a client device, a credential associated with a user identifier and a location comprises storing, at a client device, a credential associated with a user identifier, a location, and a time;

the method further comprising:

obtaining a time at the client device responsive to receiving the request to render the representation of the credential;

determining that the time at the client device is within a predefined time period associated with the credential; and responsive to determining that the location of the client device is within the predefined distance of the location associated with the credential and determining that the time at the client device is within the predefined amount of time of the time associated with the credential, storing data indicating that the user has entered the location associated with the credential at the time associated with the credential.

13. The method of claim 12, further comprising transmitting, from the client device to a server, a message indicating that the user has entered the location associated with the credential.

14. The method of claim 10, wherein determining that the location of the client device is within a predefined distance of the location associated with the credential comprises determining that the location of the client device is within a first predefined distance of the location associated with the credential;

wherein responsive to determining that the location of the client device is within the predefined distance of the location associated with the credential, storing, in a memory of the client device, data indicating that the user has entered the location associated with the credential comprises responsive to determining that the location of the client device is within the first predefined distance of the location associated with the credential, storing, in a memory of the client device, data indicating that the user has entered the location associated with the credential; and the method further comprising:

after determining that the location of the client device is within the first predefined distance of the location associated with the credential, determining that the location of the client device is beyond a second predefined distance of the location associated with the credential; and responsive to determining that the location of the client device is beyond the second predefined distance of the location associated with the credential, storing, in a memory of the client device, data indicating that the user has left the location associated with the credential.

15. The method of claim 14, further comprising transmitting, from the client device to a server, a message indicating that the user has left the location associated with the credential.

16. The method of claim 14, wherein the first predefined distance is the same as the second predefined distance.

17. The method of claim 10, further comprising:
determining that the client device lacks network connectivity;
responsive to determining that the client device lacks network connectivity, caching a message indicating that the user has entered the location associated with the credential for subsequent transmission to a server when network connectivity is restored;
determining that network connectivity has been reestablished; and
responsive to determining that network connectivity has been reestablished, sending the cached message to the server.

18. The method of claim 10, further comprising outputting, at the client device, the representation of the credential in a manner that enables the credential authority to validate the representation.

19. A system comprising:
one or more computers and one or more storage devices storing instructions that are operable, when executed by the one or more computers, to cause the one or more computers to perform operations comprising:
storing, at a client device, a credential identifier associated with a user identifier and a location;
receiving, at the client device, a request to output a graphical representation of the credential in a manner that enables a credential authority to validate the graphical representation;
responsive to receiving the request to output the graphical representation of the credential:
obtaining, at the client device, a time measured by a timing device of the client device;
generating, at the client device, the graphical representation of the credential based on the credential identifier and the time;
outputting, to a display of the client device, the generated graphical representation in a manner that enables the credential authority to validate the credential by visual inspection of the generated graphical representation;
obtaining a location of the client device;
determining that the location of the client device is within a predefined distance of the location associated with the credential;
responsive to determining that the location of the client device is within the predefined distance of the location associated with the credential, storing, in a memory of the client device, data indicating that the user has entered the location associated with the credential.

20. The system of claim 19, wherein the operations further comprise transmitting, from the client device to a server, a message indicating that the user has entered the location associated with the credential.

* * * * *